US012640542B2

(12) United States Patent
Goldenstein et al.

(10) Patent No.: US 12,640,542 B2
(45) Date of Patent: May 26, 2026

(54) ELECTRODE FOR ACTING ON A SURFACE OF CONDUCTING OR NON-CONDUCTING MATERIAL

(71) Applicant: Windmöller & Hölscher KG, Lengerich (DE)

(72) Inventors: Jens Goldenstein, Lengerich (DE); Henning Steuter, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 168 days.

(21) Appl. No.: 18/580,816

(22) PCT Filed: Jul. 19, 2022

(86) PCT No.: PCT/EP2022/070242

§ 371 (c)(1),
(2) Date: Jan. 19, 2024

(87) PCT Pub. No.: WO2023/001837

PCT Pub. Date: Jan. 26, 2023

(65) Prior Publication Data

US 2025/0038489 A1 Jan. 30, 2025

(30) Foreign Application Priority Data

Jul. 20, 2021 (DE) ..................... 10 2021 207 758.7

(51) Int. Cl.
*H01T 19/00* (2006.01)

(52) U.S. Cl.
CPC .................................... *H01T 19/00* (2013.01)

(58) Field of Classification Search
CPC .......... H01T 19/00; H01T 19/04; B29C 59/10
(Continued)

(56) References Cited

U.S. PATENT DOCUMENTS 3,385,966 A * 5/1968 Rosenthal ............... H01T 19/00 422/186.05
3,405,052 A 10/1968 Schirmer
(Continued)

FOREIGN PATENT DOCUMENTS

JP 2001284099 A * 10/2001
JP 2002232122 A * 8/2002

OTHER PUBLICATIONS

Gianpietro van de Goor, Peter Sägesser, Karl Berroth, Electrically conductive ceramic composites, Solid State Ionics, vols. 101-103, Part 2, 1997, pp. 1163-1170 (Year: 1997).*
(Continued)

*Primary Examiner* — Sreeya Sreevatsa
(74) *Attorney, Agent, or Firm* — Christian S. Hans; Bret E. Field; Bozicevic, Field & Francis LLP

(57) ABSTRACT

The invention describes an electrode for applying an electrical potential to a surface of a conductive or non-conductive material, in particular a plastic material, which electrical potential, in particular, causes electrical polarization, comprising a first electrically conductive material, in particular a metal wire, which first electrically conductive material extends at least partially parallel to the surface, comprising a second electrically conductive material extending at least partially parallel to the surface, at least one electrical connection connecting the first electrically conductive material to the second electrically conductive material, the first electrically conductive material having a greater conductivity than the second electrically conductive material.

17 Claims, 3 Drawing Sheets

Figure 1:
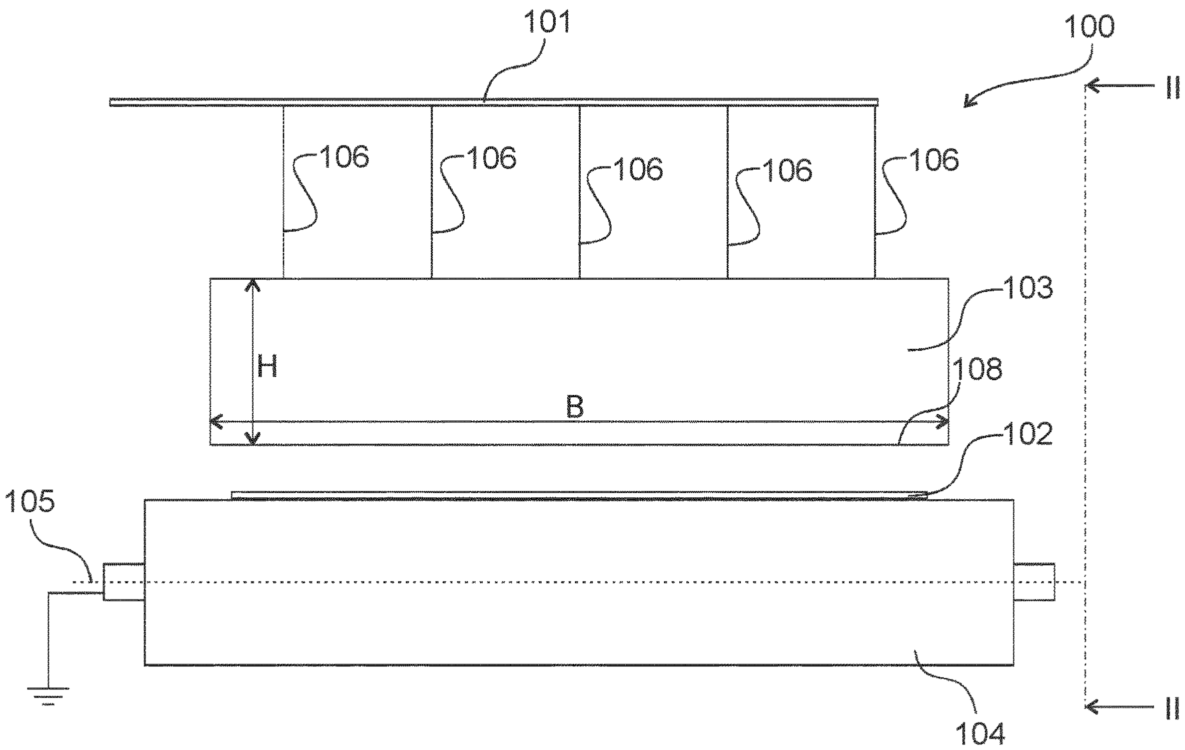

(58) Field of Classification Search
USPC .......................................................... 361/225
See application file for complete search history.

(56) References Cited

U.S. PATENT DOCUMENTS

| | | | | |
|---|---|---|---|---|
| 4,575,329 | A * | 3/1986 | Ahlbrandt ............... | B29C 59/10<br>250/326 |
| 2009/0200274 | A1 * | 8/2009 | Forster ..................... | B23H 9/14<br>219/69.15 |

OTHER PUBLICATIONS

Martin, Conductive ceramics as electrical materials at high temperatures, May 2017, p. 38, Retrieved from the Internet: https://www.ikts.fraunhofer.de/content/dam/ikts/downloads/annual_reports/jb2014/14_Conductive_ceramics_as_electrical_materials_at_high_temperatures.pdf on Nov. 8, 2022.

* cited by examiner

ELECTRODE FOR ACTING ON A SURFACE OF CONDUCTING OR NON-CONDUCTING MATERIAL

The invention relates to an electrode and a method for applying an electrical potential to a surface of a conductive or non-conductive material.

Often, an electrical potential is applied to various materials, in particular, plastic materials and preferably plastic films, to influence their properties.

For this purpose, an electrode is used to influence the material with an electrical potential. This electrode usually does not touch the material. The material is placed on or passed over an object, to which a further electrical potential is applied. This object is often grounded so that the further electrical potential is zero. In the case of plastic films, this object is often a reel or roller over which the plastic film runs.

To be able to produce noticeable effects in materials, in particular in plastic films, it is necessary to generate high potential differences between the electrode and the object, in particular the reel or roller. Needle electrodes are often used, in which a plurality of needles are arranged in a row, with the row extending parallel to the surface of the material. The needles themselves are usually aligned orthogonally to the surface of the material. This means that a very strong electric field can emanate from each needle tip.

The problem here, however, is that there is also an inhomogeneous electric field on the surface of the material, so that the material is not influenced evenly. In principle, the electric field can cause a charge shift, so that an electric charge arises at least on the surface of the material. In the case of an inhomogeneous electric field, the charge shifts in the material differ locally. Permanent traces may remain in the material, which can be disadvantageous for subsequent processing steps of the material. This is often visible when the material is a plastic material and, in particular a plastic film, the surface of which is often very sensitive.

The object of the present invention is therefore to propose an electrode and a method with which the disadvantages mentioned are avoided.

According to the invention, this object is achieved by all of the features of claim 1. Possible embodiments of the invention are specified in the dependent claims.

The object is achieved by an electrode for applying an electrical potential to a surface of a conductive or non-conductive material, in particular a plastic material, which electrical potential, in particular, causes electrical polarization, comprising a first electrically conductive material, in particular a metal wire, which first electrically conductive material extends at least partially parallel to the surface, comprising a second electrically conductive material extending at least partially parallel to the surface, at least one electrical connection connecting the first electrically conductive material to the second electrically conductive material, the first electrically conductive material having a greater conductivity than the second electrically conductive material.

For the purposes of the invention, an electrically conductive material is a component that may comprise various chemical substances. A component may be, for example, a metal wire, where the metal used may comprise an alloy. However, a component may also comprise a layer structure comprising various electrically conductive and/or electrically insulating materials.

The first electrically conductive material extends parallel to the surface of the material. If the material is moved over rollers or similar, for example, in the case of transported plastic films, one can speak of a tangential plane instead of a surface. In this case, the conductive material preferably extends transversely to the transport or movement direction of the material, i.e., parallel to its axis of rotation in the case of a roller.

The second electrically conductive material also extends parallel to the surface, with the second electrically conductive material being arranged between the material surface and the first electrically conductive material. Preferably, one edge of the second electrically conductive material faces the material, so that an electric field is implemented between this edge and the material.

Furthermore, the inventive electrode comprises an electrical connection with which an electrical conduction can be produced between the first electrically conductive material and the second electrically conductive material, so that the second electrically conductive material can be brought to an electrical potential. Said electrical connection can be established by the first electrically conductive material and the second electrically conductive material being in electrical contact. Said contact can take place at contact points, whereby a plurality of contact points may be provided and/or said contact point extends in the direction of the first electrically conductive material, so that contact is established over a distance. An electrical connection can also be established by an electrical connection line.

According to the invention it is further provided that the first electrically conductive material has a greater conductivity than the second electrically conductive material. In this case, the second electrically conductive component may be appropriately implemented for increasing an electrical field, but no large currents flow that could cause damage to the second electrically conductive material. Wires for generating a homogeneous electric field are already known from the prior art, but such wires often have slight inhomogeneities which, if the electrical currents are too high, lead to thermal effects and the wire burns out as a result. This effect is avoided with the present invention. The first electrically conductive material may have a large cross section for higher conductivity so that the electrical currents do not cause overheating. The at least one connection line can conduct the electrical currents to the second electrically conductive material. In the context of the invention, “conductivity” does not mean the specific material-dependent conductivity, but rather the absolute conductivity, which, in addition to the properties of the substances contained in the respective material, also depends on the cross-sectional area of the material.

To keep the currents in the second electrically conductive material low once again, it is advantageously provided that a plurality of electrical connection lines spaced apart from one another is provided which connect the first electrically conductive material to the second electrically conductive material.

It is advantageous if the first electrically conductive material has a conductivity that is at least $10^3$ times greater than that of the second electrically conductive material. In this case, the desired effect is particularly evident.

In a preferred embodiment of the invention it is provided that the first electrically conductive material comprises at least one metal. As a result, the first electrically conductive material can not only transmit high currents well, but, in particular, if a plurality of connection lines is provided, no or only a very small reduction in the electrical voltage between two connection lines can be observed.

Furthermore, it is advantageous if the second electrically conductive material comprises at least one plastic. The comparatively high currents encounter resistance here and are simultaneously distributed throughout the material. The currents are homogenized, in particular, when a plurality of connection lines is provided.

In a further, advantageous development of the invention it is provided that the electrical connection lines at least partially comprise the first electrically conductive material. This means that the same substances can be found here, so that the specific conductivity within this part of a connection line is not reduced.

Furthermore, it may be provided that the electrical connection lines at least partially comprise the second electrically conductive material. This results in a transition between the first electrically conductive material and the second electrically conductive material, in particular within the connection line. There are advantages here, in particular, in connection with the implementation of the second electrically conductive material described below.

It is particularly advantageous if the second electrically conductive material is implemented as at least one plate, layer and/or coating, wherein, in particular, the extension parallel to the surface is significantly greater than the thickness of the material. In this case, the electrical currents are not only distributed one-dimensionally in the electrically conductive material, but substantially two-dimensionally, so that the currents and thus the resulting electrical field on the workpiece are particularly well homogenized parallel to the surface of the material. The plate, the layer or the coating are preferably arranged orthogonally to the material. In the case in which the material is guided over a roller or reel, said plate is substantially arranged along a radial direction of the roller. The plate may comprise at least one conductive material. But it may also comprise at least one plastic material, which has been provided with a conductive varnish, for example. This may be a spray paint. With a plastic material treated in this way, surface currents can substantially be observed. Instead of a plastic material, other non-conductive materials may also be provided. Additionally or alternatively, a conductivity of an otherwise insulating material may be brought about by means of doping. Dopants are atoms of a conductive material, for example metal atoms, which are introduced into the structure of the non-conductive material. For example, metal atoms in a crystalline base material can occupy sites in the crystal structure. The valence electrons of the metal atoms can then move freely in the crystal structure, which causes conductivity.

Insulating materials may also be glasses or ceramics, which may also be plate-shaped.

To create conductivity, insulating materials can be provided with a coating or connected to a layer, for example a conductive film. A coating can be applied by vapor deposition or by means of sputter deposition, wherein a material vapor is generated by vaporization/sputtering, respectively, of a material, which is deposited on the carrier material. During vapor deposition, the material vapor is generated thermally, in the case of sputtering, by bombarding the material with high-energy ions.

A layer may be a film that has no stability of its own. Said film may be a metal film, a metallized film or an insulating film which has been made conductive analogously to one of the methods described above. Such a film may be arranged, in particular attached, to a carrier, which preferably consists of an insulating material. This may be, for example, a glass or ceramic plate.

In a preferred embodiment, two insulating materials, each provided with a layer or coating, can be placed on top of one another, with the layers or coatings facing one another. The advantage here is that people cannot come into contact with the second electrically conductive material.

The second electrically conductive material preferably has a thickness of 1 nm to 1000 nm. This is, in particular, the case when the second electrically conductive material comprises a layer and/or a coating.

If a coating is applied using one of the methods described above, this is preferably done in a vacuum environment in which a predetermined oxygen content prevails. The material vapor preferably comprises a metal, with a proportion of the metal atoms reacting with the oxygen and thus oxidizing. These metal oxides precipitate as insulating molecules, while the unoxidized atoms are deposited as conductive material. The resistance of the second electrical material can be adjusted via the oxygen content in the vacuum environment and/or via the thickness of the coating. Titanium may serve as a metal that is conductive, for example, some of the titanium atoms oxidize under the influence of oxygen to form titanium oxide, which is non-conductive but is also deposited on the insulating material. Other conceivable materials are zinc or indium.

A plate, layer and/or coating preferably has a conductivity, with the electrical resistance being between 10 and 500 MOhm (megaohm).

To increase the electric field strength acting on the material, it is provided that the second electrically conductive material is implemented as a plate, wherein the plate substantially has two surfaces arranged parallel to one another, with the surfaces being wedge-shaped in the direction of the material. One can therefore speak of a sharpened edge, so that the electric field strength is particularly high here. Compared to the needles of known electrodes, the electric field strength here is also increased due to the pointed taper, but is homogenized in the direction parallel to the material surface.

Furthermore, it is advantageous if the second electrically conductive material is implemented as a plate, the plate having protuberances directed in the direction of the first electrical material, which, in particular, represent components of the electrical connection lines. In other words, the edge of the second electrically conductive material facing the first electrically conductive material may have recesses or bulges, which are, for example, partly wedge-shaped or partly comprise circular arcs. With this special implementation it is possible to design the electrical conductivity differently in the different coordinate directions. This may result in a different conductivity in a vertical direction relative to the material surface than in a parallel direction.

The above-mentioned object is further achieved by a method for applying an electrical potential to a surface of a conductive or non-conductive material, in particular a plastic material, which electrical potential causes electrical polarization, wherein a first electrically conductive material, in particular a metal wire, extending at least partially parallel to the surface is subjected to an electrical potential, wherein the material is at least partially subjected to the potential via a second electrically conductive material extending at least partially parallel to the surface, wherein the second electrically conductive material comprising at least one electrical connection line, which electrically connects the first electrically conductive material to the second electrically conductive material, is brought at least partially to the electrical potential, the first electrically conductive material having a greater conductivity than the second electrically conductive material.

This results in the same advantages as have already been described in connection with the electrode according to the invention.

Figure 2:
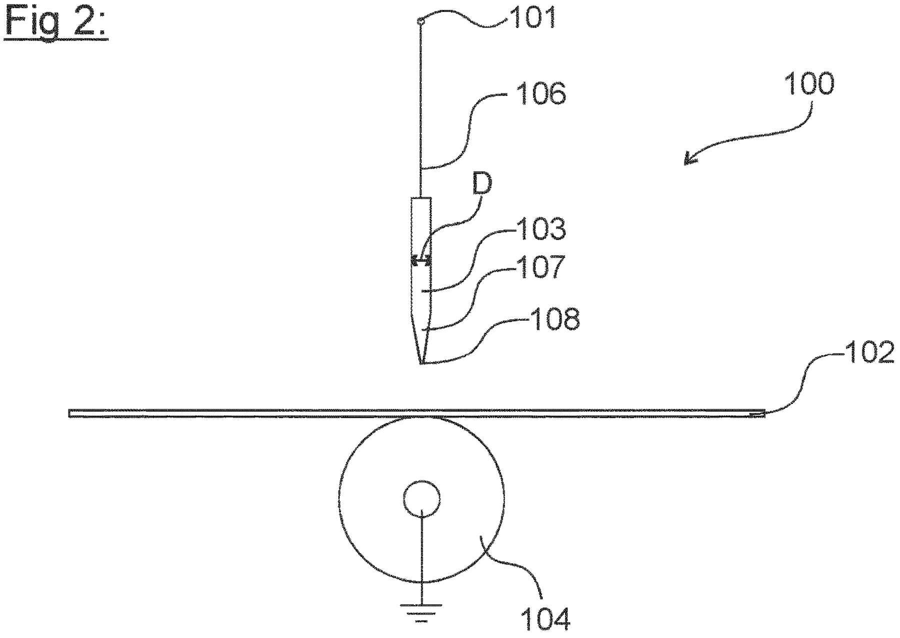
Figure 3:
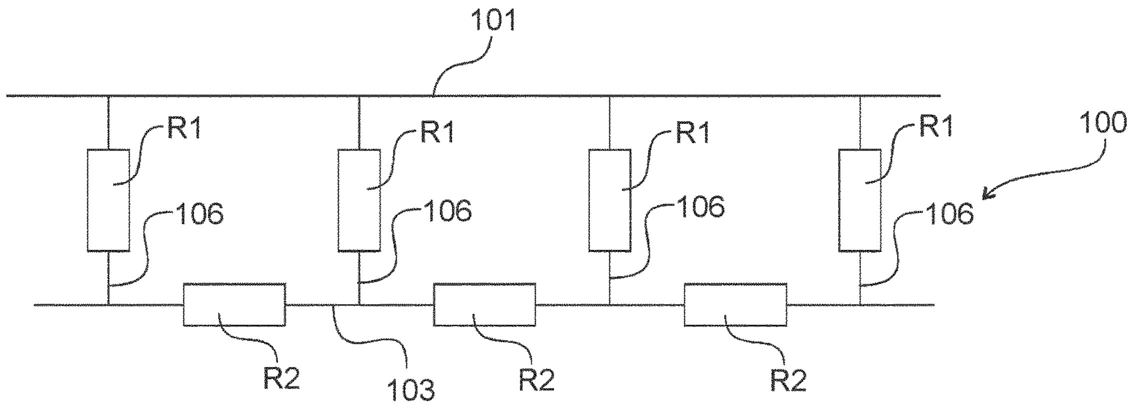
Figure 4:
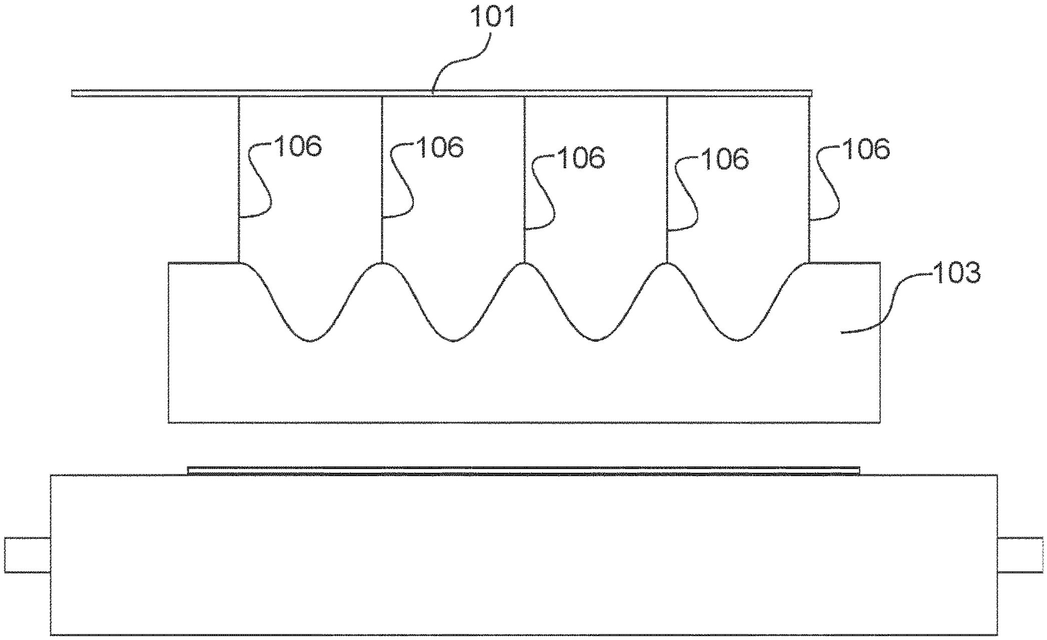
Figure 5:
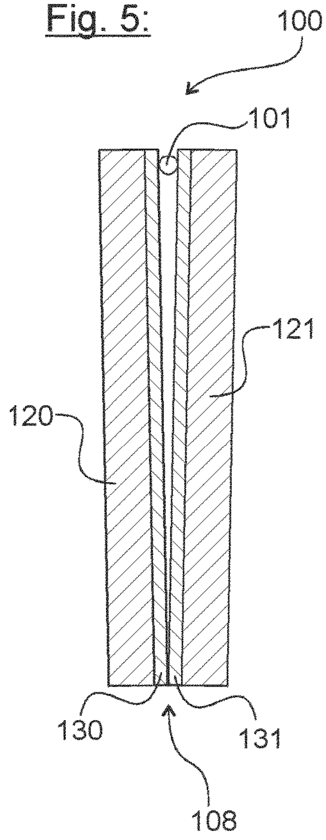
Figure 6:
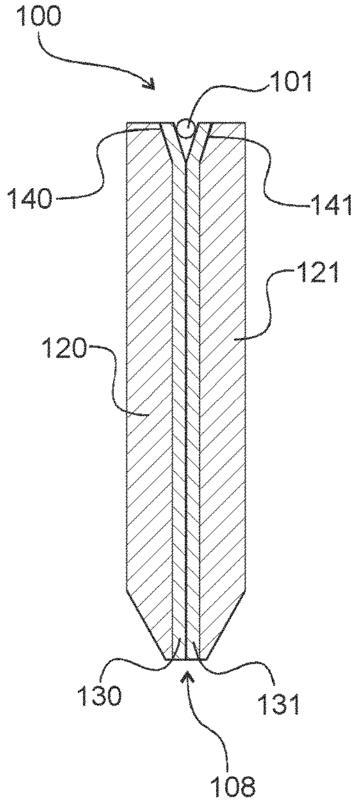
Figure 7:
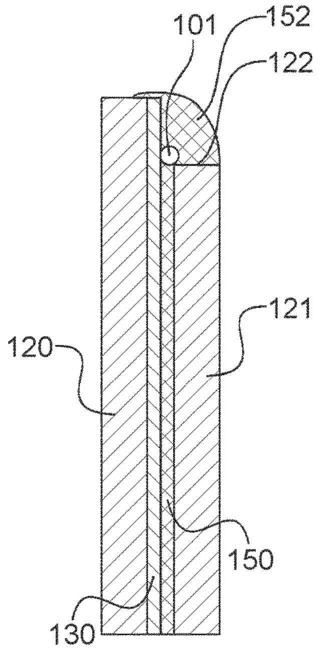
Figure 8:
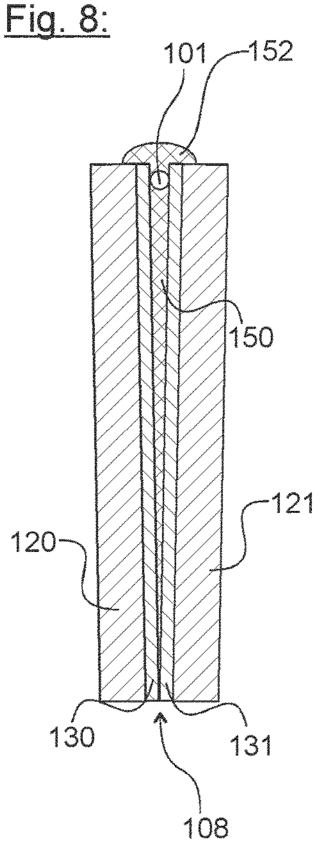
Figure 9:
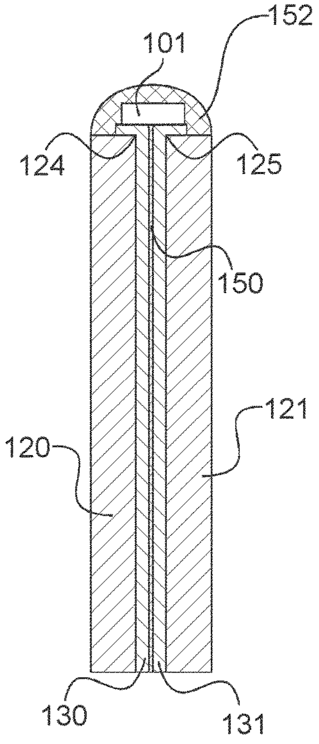

Further advantages, features and details of the invention are shown in the following description, in which various exemplary embodiments are explained in detail with reference to the figures. The features mentioned in the claims and in the description can each be essential to the invention individually or in any combination of features mentioned. Within the scope of the entire disclosure, features and details that are described in connection with the method according to the invention naturally also apply in connection with the electrode according to the invention and vice versa, so that reference is or can always be made reciprocally to the individual aspects of the invention with regard to the disclosure. The individual figures show:

FIG. 1 an illustration of an electrode arrangement,

FIG. 2 a side view II-II of the electrode of FIG. 1,

FIG. 3 an equivalent circuit diagram of an electrode arrangement,

FIG. 4 an illustration of a further electrode arrangement,

FIG. 5 another side view of an electrode according to the invention,

FIG. 6 another side view of an electrode according to the invention,

FIG. 7 another side view of an electrode according to the invention,

FIG. 8 another side view of an electrode according to the invention,

FIG. 9 another side view of an electrode according to the invention,

FIGS. 1 and 2 show an electrode 100 according to the invention comprising a wire 101 representing a first electrically conductive material. Said wire 101 can be brought to an electrical potential relative to earth potential, i.e. zero, using a generator (not shown). This creates a voltage between the electrode and the ground which is advantageously more than 1 kilovolt (kV), preferably more than 10 kV. The wire 101, which preferably consists of one or more metals, may have a high conductivity so that the electrical potential is the same at all points, even if electrical charges are discharged. Instead of a wire, another implementation of the first electrically conductive material may also be provided, for example, a rod or a tube, each of which is rigid.

A second electrically conductive material, which has a lower conductivity than the first electrically conductive material, is arranged between the wire 101 and the material 102. The second electrically conductive material is implemented as a plate 103 in the present exemplary embodiment. This design means that its width B and its height H are significantly greater than the thickness D. The width B preferably extends parallel to the support 104 for the material 102, in the present example parallel to the axis of rotation 105 of the support designed as a roller. The height H can extend perpendicular to this. A preferred thickness of a plate is up to a maximum of 5 mm. The preferred height of a plate is between 1 cm and 20 cm. The preferred width of a plate is between 50 cm and 400 cm.

The support can also be brought to an electrical potential using a generator. In the present, particularly advantageous case, the support 104 is grounded.

The plate 103 may, for example, be a plastic plate that has no or only minimal conductivity. Said plastic plate may then be coated, for example, vapor-deposited, with a conductive substance or mixture of substances to enable surface conductivity.

The plate 103 is connected to the wire 101 via one, but, in particular, via a plurality of connections 106. Said connections may be made of the same material as the wire 101. However, the connections may each have a lower conductivity than the wire 101 by having a smaller cross-sectional area than said wire and/or comprise a different material.

It can also be seen from FIG. 2 that the plate tapers toward the material 102, for example, in the shape of a wedge 107. This creates a large electric field strength at the edge 108.

FIG. 3 now shows a so-called equivalent circuit diagram of a preferred embodiment of the electrode 100 according to FIGS. 1 and 2.

The wire 101 is shown as a line, which means that it offers no electrical resistance to the electrical current. This means there is the same electrical voltage at every point on the wire. The connections 106 comprise resistors R1 that cause an electrical voltage drop.

The plate 103 can be viewed as a series of resistors R2, with a feed-in point of the connection 106 between each resistor R2. A resistor R2 means that an electrical current cannot flow freely parallel to the support 104. This prevents local overheating and thus damage to the plate 103 and/or the material 102.

FIG. 4 shows a further electrode according to the invention, which is constructed like the electrode shown in FIG. 1. The main difference is that the edge on which the connections 106 are arranged are now designed as recesses 109. This means that the height of the plate 103 is reduced between every two connections. In the present example, these are arcuate recesses 109, whereby the curve is continuous. However, other implementations are also conceivable, such as wedge-shaped recesses. The recesses change the electrical resistance caused by the plate 103. A suitable design of the implementations therefore influences the conductivity of the plate 103 within or along the plane defined by it. This makes it possible to equalize the electric field strength at the edge 108 over the entire width B.

FIG. 5 shows a side view of a further embodiment of an electrode 100 according to the invention. Firstly, said electrode comprises two insulator plates 120, 121, for example, two glass plates. Said insulator plates each carry a layer 130, 131, for example, a glued-on film, and/or a coating, which was applied, for example, by means of vapor deposition or by means of sputter disposition. The thickness of the layer or coating is preferably a maximum of 500 nm. The insulator plates are arranged such that the layer and/or coatings 130, 131 face one another and at least partially touch one another. As in the exemplary embodiments described in connection with FIGS. 1 to 4, the current or voltage supply is ensured by the wire 101, which is preferably held clamped between the insulator plates and is in electrically conductive contact with one or both layers or coatings 130, 131. The edge 108 facing away from the wire faces the material not shown in FIG. 5, as shown in FIG. 2. The same arrangement also applies to FIGS. 6 to 9.

To fasten the insulator plates 120, 121 to one another, clamps (not shown) may be provided, the clamp arms of which can be placed on the outside of the insulator plates and exert a force on the insulator plates that is directed toward one another. Instead of or in addition to the clamping, at least one screw connection may be provided, wherein the insulator plates may be provided with through openings, in particular through holes, through which a screw, a threaded rod, a bolt or the like can reach.

In order not to create contact with the layer or coating, it may be provided to keep the layer or coating free of the layer or coating in the area of the through openings of the insulator plates 130, 131. However, keeping said area free may also be done for other reasons and is therefore independent of the exemplary embodiment in FIG. 5. To create such a free area, a layer may be provided with one or more openings before being connected to the insulator plate, which openings are designed, in particular, such that, when said layer rests on the insulator plate, said layer has a clearance from the respective through opening and/or said layer has a desired circumferential shape. When coating, the areas that need to be kept free can be masked off before the coating process. After the coating process, the masking must be removed again so that areas that are to remain free of the coating do not contain any coating.

FIG. 6 shows a structure of the electrode according to the invention that is similar to FIG. 5. A significant difference is that the insulator plates 120 and 121 have bulges 140 and 141 in their upper region, which face one another and which each comprise the layer or the coating. The bulges, which may be designed as slopes (as shown), thus form a channel-like depression, visible in the cross section shown, into which the wire 101 is inserted. The advantage here is that the layers or coatings 130, 131 are now stacked on top of one another over a large area.

Another aspect, which is shown in FIG. 6, but which may be combined with all other exemplary embodiments of this disclosure regardless of the exemplary embodiment of this figure, is the taper of the tip of the electrode facing the material (not shown) in the direction of the material. With this feature, the electric field strength in the area of the edge 108 can be increased.

FIG. 7 shows a further exemplary embodiment of an electrode according to the invention, in which only the insulator plate 120 carries a layer or coating 130. This aspect of the invention can also be combined with all other exemplary embodiments shown in this disclosure.

FIG. 7 shows a second aspect of the invention that can be freely combined with other exemplary embodiments. According to the second aspect, the second insulator plate 121 is connected to the first insulator plate 121 via an adhesive connection 150, so that a mechanical connection can be dispensed with.

FIG. 7 shows a third aspect of the invention that can be freely combined with other exemplary embodiments. According to the third aspect, the second insulator plate 121 is reduced in size compared to the insulator plate 120. The wire 101 rests on the plateau 122 of the insulator plate 121, said wire contacting the layer or coating 130. The wire 101 is insulated from the environment by an adhesive coating 152.

FIG. 8 shows an exemplary embodiment of the invention, which is designed similarly to the embodiment of FIG. 5. Here again—as has already been explained in connection with FIG. 7-*a* mechanical connection of the insulator plates 120 and 121 is dispensed with and a connection is provided by means of an adhesive connection. Again, the wire 101 may be shielded from the environment by an adhesive coating 152.

FIG. 9 shows yet another exemplary embodiment of the invention, in which the layers or coatings 130 and 131 are wrapped around the upper inner edges 124 and 125 and thus extend to the upper surfaces of the insulator plates 120, 121. In this case, the wire 101 may also be designed as a ribbon, which contacts both layers or coatings in an electrically conductive manner. Here too, the wire 101 may be shielded from the environment by an adhesive coating 152.

In a further aspect of the invention, which is not shown in any of the figures, further insulator plates may be arranged between two insulator plates 120, 121, which may have no layer or coating, or one layer or coating on one or both sides. In this way it is possible to further increase the electric field strength in the area of the edge 108.

| Reference sign list | |
|---|---|
| 100 | Electrode |
| 101 | Wire |
| 102 | Material |
| 103 | Plate |
| 104 | Support |
| 105 | Axis of rotation |
| 106 | Connection |
| 107 | Wedge |
| 108 | Edge |
| 109 | Recess |
| 120 | Insulator plate |
| 121 | Insulator plate |
| 122 | Plateau |
| 130 | L |
| 131 | L |
| 140 | Bulge |
| 141 | Bulge |
| 150 | Adhesive connection |
| 152 | Adhesive coating |
| R1 | Resistor |
| R2 | Resistor |

The invention claimed is:

1. An electrode for applying an electrical potential to a surface of a conductive or non-conductive material, comprising a first electrically conductive material, which first electrically conductive material extends at least partially parallel to the surface, a second electrically conductive material extending at least partially parallel to the surface, at least one electrical connection connecting the first electrically conductive material to the second electrically conductive material, the first electrically conductive material having a greater conductivity than the second electrically conductive material, wherein the second electrically conductive material is formed as a plate, wherein the plate comprises two surfaces arranged parallel to each other.

2. The electrode according to claim 1, wherein the at least one electrical connection comprises a plurality of electrical connection lines spaced apart from one another are provided which connect the first electrically conductive material to the second electrically conductive material.

3. The electrode according to claim 1, characterized in that the first electrically conductive material has a conductivity that is at least $10^3$ times greater than the second electrically conductive material.

4. The electrode according to claim 1, characterized in that the first electrically conductive material comprises at least one metal.

5. The electrode according to claim 1, characterized in that the second electrically conductive material comprises at least one plastic.

6. The electrode according to claim 1, characterized in that the at least one electrical connection at least partially comprises the first electrically conductive material.

7. The electrode according to claim 1, characterized in that the electrical connection at least partially comprises the second electrically conductive material.

8. The electrode according to claim 1, wherein the extension of the second electrically conductive material that is parallel to the surface is significantly greater than a thickness of the material.

9. The electrode according to claim 1, wherein the two surfaces of the plate are wedge-shaped in a direction towards the conductive material.

10. The electrode according to claim 1, wherein the plate comprises protuberances directed in a direction of the first electrically conductive material.

11. The electrode according to claim 1, wherein the non-conductive material comprises a plastic material.

12. The electrode according to claim 1, wherein the first electrically conductive material comprises a metal wire.

13. The electrode according to claim 1, wherein the electrical potential causes electrical polarization.

14. A method for applying an electrical potential to a surface of a conductive or non-conductive material, wherein a first electrically conductive material, extending at least partially parallel to the surface is subjected to an electrical potential, wherein the material is at least partially subjected to the potential via a second electrically conductive material extending at least partially parallel to the surface, wherein the second electrically conductive material comprising at least one electrical connection line, which electrically connects the first electrically conductive material to the second electrically conductive material, is brought at least partially to the electrical potential, the first electrically conductive material having a greater conductivity than the second electrically conductive material, wherein the second electrically conductive material is formed as a plate, wherein the plate comprises two surfaces arranged parallel to each other.

15. The method according to claim 14, wherein the non-conductive material comprises a plastic material.

16. The method according to claim 14, wherein the first electrically conductive material comprises a metal wire.

17. The method according to claim 14, wherein the electrical potential causes electrical polarization.

* * * * *